United States Patent

[11] 3,602,590

[72] Inventor Alfred B. Lukens
 1303 Craigwood Road, Toledo, Ohio 43612
[21] Appl. No. 846,519
[22] Filed July 31, 1969
[45] Patented Aug. 31, 1971

[54] METHOD OF PRODUCING PHOTOGRAPHIC PRINT COMPRISING HIGH CONTRAST AND LESSER CONTRAST PORTIONS
 3 Claims, 1 Drawing Fig.
[52] U.S. Cl. .................................................. 355/40,
 95/1.1, 355/79, 96/42, 352/47, 352/81
[51] Int. Cl. ......................................................G03b 27/32,
 G03c 5/04
[50] Field of Search........................................... 355/40, 79;
 96/42; 352/47, 55, 81

[56] References Cited
UNITED STATES PATENTS
240,374 4/1881 Brigham..................... 355/79

Primary Examiner—John M. Horan
Attorney—Marshall & Yeasting

ABSTRACT: At least one negative for contact printing of a pictorial portion of the print is prepared on relatively low contrast film. A second negative which is transparent in the area in which said pictorial portion is to appear, and the size of which is reduced from the size of the print that is to be produced, is prepared on relatively high contrast film. An enlarged image is projected from the second negative onto a supporting surface while the first negative is located in such a position relative to the supporting surface as to cover the projection of the transparent area of the second negative. Sensitized paper is exposed on the supporting surface, beneath the so-located first negative, to produce a photographic print by subjecting it to the enlarged projected image from the second negative while transmitting light through the first negative from the transparent area of the second negative.

PATENTED AUG31 1971 3,602,590
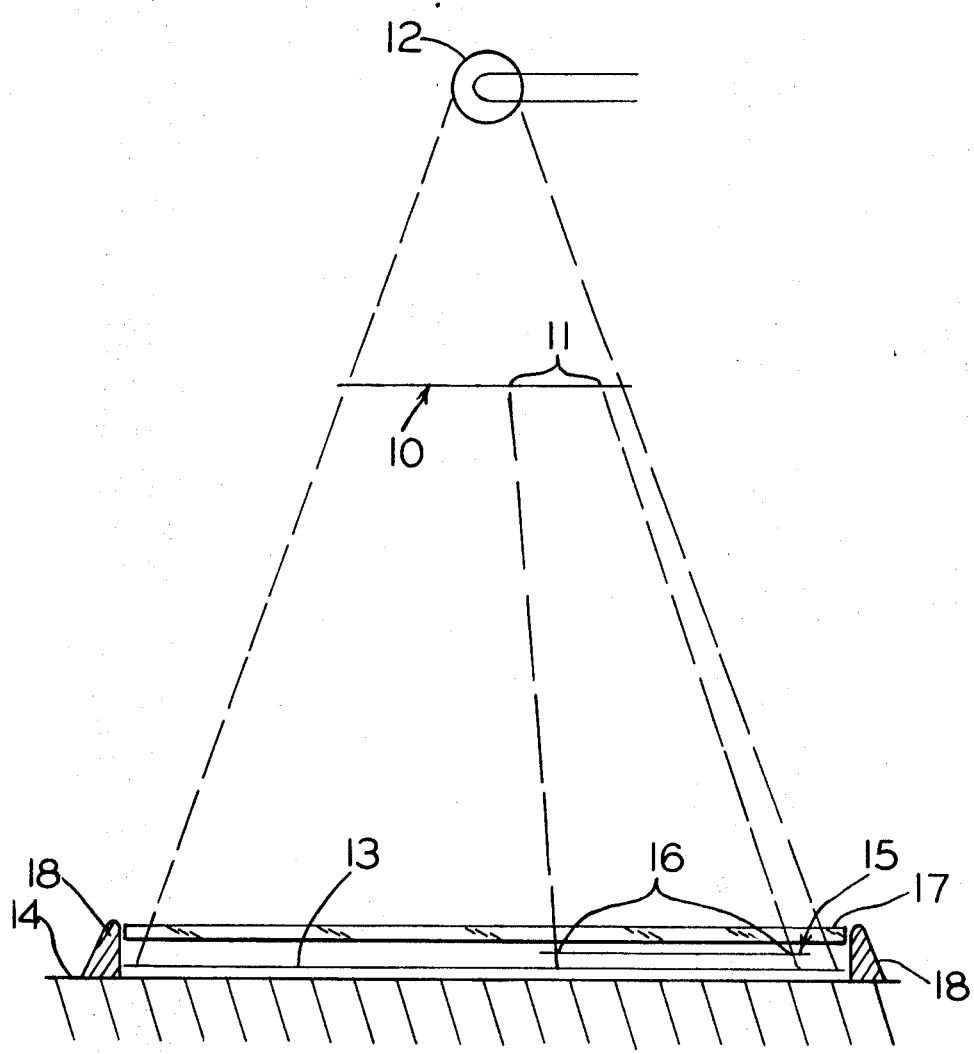
INVENTER.
ALFRED B. LUKENS
BY
Marshall & Yoasting
Attorneys

METHOD OF PRODUCING PHOTOGRAPHIC PRINT COMPRISING HIGH CONTRAST AND LESSER CONTRAST PORTIONS

BACKGROUND OF THE INVENTION

Frequently, it is desirable to produce a record that contains both printed matter and one or more pictorial illustrations. One example of such a record is a surveyor's report, real estate appraisal or similar report which contains printed matter relating to a piece of real property and also contains one or more photographic views showing the appearance of the property. Another example is a personnel record or credit record, a police record or some other record concerning an individual which includes one or more photographs of the individual.

In order to make a satisfactory reproduction of a photograph, when the photograph is a pictorial view containing half tones, it is necessary to make a print on sensitized paper from a negative. Printed matter which is to appear on the same page with the pictorial view or views also must be printed on the sensitized paper from a negative.

When printed matter as well as a pictorial view or views is to be printed upon a sheet of sensitized paper, it is not possible to print both the printed matter and the pictorial view or views from a single negative. The negative which contains the printed matter must be a relatively high contrast negative, made on high contrast film, while the pictorial view or views must be photographed on lesser contrast film. High contrast film must be used for photographing the printed matter so that on the final print on sensitized paper the printed matter will be entirely black and the background of the printed matter will be entirely white. If lesser contrast film were used for photographing the printed matter, the print made on sensitized paper from the resulting film would show the printed matter as a dark grey and the background of the printed matter as a light grey.

On the other hand, the pictorial views must be photographed on ordinary black and white film of lesser contrast. If high contrast film, which must be used in photographing printed matter, were used for photographing the pictorial views, the resulting views would consist of dead blacks and dead whites with substantially no half tones.

Because of the necessity of using high contrast film for printed matter and using film of lesser contrast for pictorial views, it has been very inconvenient heretofore to produce a print upon sensitized paper which shows both printed matter and pictorial views.

SUMMARY OF THE INVENTION

The present invention provides a very rapid and convenient method of producing a photographic print comprising high contrast portions, such as black-printed matter on a white background, and also comprising at least one pictorial portion of lesser contrast.

In accordance with the present method, the desired pictorial view is provided by photographing the subject on regular black and white film, to produce a negative showing half tones of various shades.

A copy of the matter to be shown in the finished photographic print, other than the pictorial portion or portions of the print, is also prepared. The subject matter of this copy may consist of printed matter or a line drawing, all of which is to appear in the finished print in black upon a white background, to provide a high contrast so that the black-printed matter or line drawing will be sharp and clear in the finished print. This copy shows the appearance of the finished print except that it has a blank space in the area where each pictorial view is to appear. On this copy, the area where each pictorial view is to appear is then covered with a piece of black paper, and the copy is photographed on relatively high contrast film. The resulting negative is transparent in the area in which the pictorial portion is to appear.

This negative is then placed in a projector, and an image is projected from the negative onto a supporting surface. Since the negative is transparent in the area in which the pictorial view is to appear, the image that is projected onto the supporting surface contains a bright area corresponding to the transparent area of the negative. The size of the projected image should be such that this bright area is slightly smaller than the area of the other negative which contains the pictorial view.

The finished photographic print is then produced by exposing a sheet of sensitized paper on the supporting surface. After the sheet of sensitized paper has been placed upon the supporting surface, the negative which contains the pictorial view is placed upon the sensitized paper, with the emulsion side of the negative in contact with the paper, the location of this negative being such that this negative will overlap on all sides the bright area which will be produced by projecting the image from the high contrast negative onto the sensitized paper.

It has been found that in accordance with the present method an excellent photographic print can be produced by projecting an image from the high contrast negative onto the sensitized paper. The light which is transmitted through the transparent area of the high contrast negative produces a brightly illuminated area on the pictorial negative, so as to produce a contact print of the pictorial negative at the proper location on the sensitized paper. The pictorial view which is thus printed on the sensitized paper has the desired shading of half tones. The remainder of the matter on the finished photographic print, which is printed by projection from the high contrast negative, consists of sharp and clear black lettering or lines on a white background.

BRIEF DESCRIPTION OF THE DRAWING

The drawing is a diagram illustrating the manner in which the present method is carried out.

DESCRIPTION OF THE PREFERRED EMBODIMENTS

A photographic print produced by the present method comprises high contrast portions, consisting for example of printed matter or a line drawing, and at least one pictorial portion of lesser contrast. The pictorial portion of the photographic print may be produced in accordance with the present method from any photographic negative which has been prepared by photographing the desired view upon ordinary black and white film.

The material other than the pictorial view or views which is to appear upon the finished print usually consists of printed matter or a line drawing. A copy of this material is prepared, as it is to appear in the finished print, and on this copy each area in which a pictorial view is to appear is covered with a piece of black paper which has been cut to the size and shape of the pictorial view which is to appear on the finished print. The copy thus prepared, with each pictorial view replaced by a sheet of black paper which is of the same size and shape as the pictorial view, is then photographed upon a relatively high contrast film such as Contrast Process Ortho. The resulting negative 10 then has a clear area 11 which is the image of the sheet of black paper, photographed upon the negative 10.

The negative 10, having the clear area or areas 11, is then placed in a conventional projector, which is represented in the drawing as a light source 12. The projector includes a conventional condensing lens and a conventional projecting lens, both of which are omitted from the drawing for the sake of simplicity.

In the practice of the present method, the projector including the light source 12 projects an image from the negative 10 onto a sheet of sensitized paper 13 which is resting upon a supporting surface 14. In order that the photographic print thus produced upon the sensitized paper 13 may include the desired pictorial view, the negative 15 upon which the desired pictorial view has been photographed is arranged with its emulsion side in contact with the sensitized paper 13 while the image from the film 10 is being projected upon the sensitized paper. During this operation, a beam of light passing through the transparent area 11 of the negative 10 illuminates an area 16 of the pictorial negative 15. The projector must be adjusted so that the illuminated area 16 is slightly smaller than the total area of the pictorial negative 15, and the negative 15 must be located so that it overlaps the illuminated area 16 on all sides as indicated in the drawing.

A photographic print produced by the present method includes one or more pictorial portions, such as the pictorial portion which is printed by light in the illuminated area 16 transmitted through the pictorial negative 15. These pictorial portions of the photographic print have the desired shading of the half tones in order to show all the details in the darker and lighter parts of each pictorial view. The portions of the photographic print other than the pictorial portions consist of a line drawing or printed matter which is dead black, upon a background which is dead white. These portions of high contrast on the photographic print are produced by projection of the image from the high contrast negative 10.

The sensitized paper 13 upon which the photographic print is produced may consist of ordinary "enlarging paper" which is commonly used for making enlarged prints in a conventional enlarger. The apparatus used for carrying out the present method may consist of a conventional enlarger, such as an "Omega D3" enlarger.

Various procedures may be used for locating the pictorial negative 15 in the proper position. In the preferred procedure, the pictorial negative 15 is first placed directly upon the supporting surface 14, emulsion side down, with no sensitized paper 13 present. The image from the high contrast negative 10 is then projected directly upon the supporting surface 14, and the pictorial negative 15 is located on the supporting surface 14 in the proper position so that the negative 15 overlaps on all sides the illuminated area 16 that is produced by transmission of light through the transparent area 11 of the high contrast negative 10. With the pictorial negative 15 thus properly located, a small piece of double-coated transparent tape such as "Scotch" tape, is placed in each corner of the negative 15 on its upper surface. A sheet of transparent plastic 17, such as a sheet of polymethylmethacrylate, is then pressed upon the pictorial negative 15 so that the double-coated transparent tape causes the pictorial negative 15 to adhere at all four corners to the transparent plate 17.

The supporting surface 14 must be provided with a suitable arrangement for locating the transparent plate 17, such as a frame or molding 18 into which the plate 17 fits, so that the plate 17 will always be in exactly the same position when placed upon the supporting surface 14. Preferably the plate 17 is the same size and shape as the sheet of sensitized paper 13, so that the molding or frame 18 which locates the plate 17 will also serve to locate the sheet of sensitized paper 13.

After the pictorial negative 15 has been caused to adhere to the transparent plate 17, the transparent plate 17 with the adhering negative may be removed momentarily to permit the sheet of sensitized paper 13 to be placed upon the supporting surface 14. The transparent plate 17 is then replaced, with the pictorial negative 15 still in the proper position, and the image is projected from the high contrast negative 17 in order to expose the sensitized paper 13. The sensitized paper is then removed and developed in the usual manner.

The foregoing procedure is particularly convenient when several identical photographic prints are to be produced by repeating the printing operation, using a fresh sheet of sensitized paper 13 in each operation. In an alternative procedure, a hole is cut in the transparent plate which is the same size and shape as the pictorial negative 15, and which is properly located so that the hole in the transparent plate serves as a frame to locate the pictorial negative 15 in the correct position. In this procedure, the transparent plate is first placed upon the sensitized paper 13, and the pictorial negative 15 is then dropped into the opening or hole in the plastic plate which locates the pictorial negative 15 in the correct position. This procedure is not convenient when several identical photographic prints are to be produced, or when varied photographic prints are to be produced with pictorial views in various positions on the prints.

The present method takes advantage of the fact that sensitized paper has high versatility in that it will give high contrast or ordinary contrast, depending upon the characteristics of the negative used to make the print. Photographic film does not have such versatility, and different types of film must be used to give different degrees of contrast.

I claim:

1. A method of producing a photographic print comprising a high contrast portion including reading matter, and a pictorial portion of lesser contrast, comprising the steps of (a) preparing a copy of the material which is to appear on the high contrast portion, having a black area where the pictorial portion is to appear, (b) photographing such copy on relatively high contrast film to produce a negative which has a transparent area where the pictorial portion is to appear, and the size of which is reduced from the size of the finished print that is to be produced, (c) preparing a second negative on lesser contrast film which shows the pictorial portion and is slightly larger than the area of the finished print where the pictorial portion is to appear, (d) projecting an enlarged image from the first negative onto a supporting surface, while (e) locating the second negative in such a position on the supporting surface as to overlap on all sides the projection of the transparent area of the first negative, and (f) exposing sensitized paper on the supporting surface, beneath the thus located second negative, so as to subject the sensitized paper to the enlarged projected image from the first negative while transmitting light from the transparent area of the first negative through the second negative.

2. A method of producing a photographic print according to claim 1 wherein, during the exposure of the sensitized paper, the second negative is held in position, with its emulsion side in contact with the sensitized paper, by a transparent plate resting upon the sensitized paper.

3. A method of producing a photographic print according to claim 2 comprising the steps of applying an adhesive material on the back of the second negative, placing its emulsion side down on the supporting surface while locating it relative to the supporting surface, then placing the transparent plate in a fixed position on top of the second negative, to cause the second negative to adhere to the transparent plate, removing the transparent plate with the adhering negative in order to permit the sensitized paper to be placed on the supporting surface, and then maintaining the transparent plate in said fixed position while projecting the enlarged image of the first negative through the transparent plate.